(12) United States Patent
Gunji (10) Patent No.: US 11,032,463 B2
(45) Date of Patent: Jun. 8, 2021

(54) IMAGE CAPTURE APPARATUS AND CONTROL METHOD THEREOF

(71) Applicant: CANON KABUSHIKI KAISHA, Tokyo (JP)

(72) Inventor: Koichi Gunji, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 16/381,095

(22) Filed: Apr. 11, 2019

(65) Prior Publication Data

US 2019/0349513 A1    Nov. 14, 2019

(30) Foreign Application Priority Data

May 10, 2018 (JP) .............................. JP2018-091406

(51) Int. Cl.
  *H04N 5/232* (2006.01)
  *G02B 7/09* (2021.01)
  *G06F 9/30* (2018.01)

(52) U.S. Cl.
  CPC .......... *H04N 5/23212* (2013.01); *G02B 7/09* (2013.01); *G06F 9/3004* (2013.01); *H04N 5/23229* (2013.01)

(58) Field of Classification Search
  CPC .......... H04N 5/23212; H04N 5/23229; H04N 5/232127; H04N 5/232945; H04N 5/232122; H04N 5/23293; H04N 5/217; H04N 5/23219; H04N 9/045; G02B 7/09; G02B 27/00; G06F 9/3004
  See application file for complete search history.

(56) References Cited

U.S. PATENT DOCUMENTS

| | | | | |
|---|---|---|---|---|
| 2009/0009652 | A1* | 1/2009 | Sudo | H04N 5/23293 348/349 |
| 2009/0231470 | A1* | 9/2009 | Hitosuga | H04N 5/23293 348/239 |
| 2012/0044402 | A1* | 2/2012 | Yamaguchi | H04N 5/232123 348/333.11 |
| 2012/0057802 | A1* | 3/2012 | Yuki | H04N 19/59 382/243 |
| 2018/0196221 | A1* | 7/2018 | Sun | G03B 13/20 |

FOREIGN PATENT DOCUMENTS

JP    2016-058764 A    4/2016

* cited by examiner

*Primary Examiner* — Lin Ye
*Assistant Examiner* — Tuan H Le
(74) *Attorney, Agent, or Firm* — Cowan, Liebowitz & Latman, P.C.

(57) ABSTRACT

An image capturing apparatus, comprises a detector configured to detect a focus adjustment position in an image, a processor configured to generate a composite image in which a guide indicating the detected position is superimposed on the image, a display configured to display the composite image generated by the processor, and a controller configured to update, in accordance with information of the position detected by the detector, display information used for processing for generating the composite image.

15 Claims, 10 Drawing Sheets

```
0~17      : A=0, COLOR=0
18        : α=100, COLOR=RED
19~29     : α=0, COLOR=0
30, 31    : α=100, COLOR=RED
32~42     : α=0, COLOR=0
43, 44    : α=100, COLOR=RED
45~56     : α=0, COLOR=0
57        : α=100, COLOR=RED
58~142    : α=0, COLOR=0
```

FIG. 3D
$\begin{cases} 0\sim17 & : A=0, COLOR=0 \\ 18 & : \alpha=100, COLOR=RED \\ 19\sim29 & : \alpha=0, COLOR=0 \\ 30, 31 & : \alpha=100, COLOR=RED \\ 32\sim42 & : \alpha=0, COLOR=0 \\ 43, 44 & : \alpha=100, COLOR=RED \\ 45\sim56 & : \alpha=0, COLOR=0 \\ 57 & : \alpha=100, COLOR=RED \\ 58\sim142 & : \alpha=0, COLOR=0 \end{cases}$

FIG. 6B
{
0~17 : α=0, COLOR=0
18 : α=100, COLOR=RED
19~29 : α=0, COLOR=0
30, 31 : α=100, COLOR=RED
32~42 : α=0, COLOR=0
43, 44 : α=100, COLOR=RED
45~56 : α=0, COLOR=0
57 : α=100, COLOR=RED
58~61 : α=0, COLOR=0
62 : α=100, COLOR=BLUE
63~74 : α=0, COLOR=0
75, 76 : α=100, COLOR=BLUE
77~103 : α=0, COLOR=0
104~106 : α=100, COLOR=GREEN
107~116 : α=0, COLOR=0
117~119 : α=100, COLOR=GREEN
120~142 : α=0, COLOR=0
}

FIG. 7

LUT CAPACITY 32×64 = 2048bit(256byte)

| Frames | 0 | 8 | 16 | 24 | 31 | ... | 2047 |
|---|---|---|---|---|---|---|---|
| NUMBER OF FRAMES 64 | A0(8bit) | R0(8bit) | G0(8bit) | B0(8bit) | | ... | B63(8bit) |
| NUMBER OF FRAMES 128 | A0(4bit) | R0(4bit) | G0(4bit) | B0(4bit) | A1(4bit) | R1(4bit) | G1(4bit) | B1(4bit) | ... | B127(4bit) |
| NUMBER OF FRAMES 256 | A0 R0 G0 B0 A1 R1 G1 B1 (2bit each) | A2 R2 G2 B2 A3 R3 G3 B3 (2bit each) | ... | A255 R255 G255 B255 (2bit) |
| NUMBER OF FRAMES 512 | A R G B (0) | A R G B (1) | A R G B (2) | A R G B (3) | A R G B (4) | A R G B (5) | A R G B (6) | A R G B (7) | ... | A R G B (510) | A R G B (511) |

IMAGE CAPTURE APPARATUS AND CONTROL METHOD THEREOF

BACKGROUND OF THE INVENTION

Field of the Invention

The present invention is related to a technique for displaying a focus frame in an image.

Description of the Related Art

In digital cameras and digital video cameras, a live view image is displayed on a display or electronic view finder (EVF) in the camera or a display unit external to the camera, and shooting is performed while confirming a shooting target.

Also, an auto focus (AF) function is provided in digital cameras and digital video cameras. A photographer can confirm a focus position in the image by an AF function, but confirmation of the focus position is difficult in a small camera since the display is also small and the resolution is low.

Accordingly, as supplementary information for confirming the focus position in the image, for example, there is a method of displaying a frame at a focus position of the image, a method of enlarging and displaying a part of the image, and a method called peaking of thickly coloring a contour of an object in the display. Also, in Japanese Patent Laid-Open No. 2016-58764, a method of using object distance information to display only an image of a region that is in-focus, and not display other image regions is described.

However, in the foregoing conventional techniques, there are cases in which time is required for image processing, and the display processing for the guide for confirming the focus position in the image cannot follow the movement of an object or focus detection.

SUMMARY OF THE INVENTION

The present invention has been made in consideration of the aforementioned problems, and realizes techniques for accelerating display processing for a guide for confirming a focus position in an image, and enabling display that follows object movement and focus detection.

In order to solve the aforementioned problems, the present invention provides an image capturing apparatus, comprising: a detector configured to detect a focus adjustment position in an image; a processor configured to generate a composite image in which a guide indicating the detected position is superimposed on the image; a display configured to display the composite image generated by the processor; and a controller configured to update, in accordance with information of the position detected by the detector, display information used for processing for generating the composite image.

In order to solve the aforementioned problems, the present invention provides a method for controlling an image capture apparatus having a detector, a processor, a display and a controller, the method comprising: detecting a focus adjustment position in an image; generating a composite image in which a guide indicating the detected position is superimposed on the image; displaying the composite image generated by the processor; and updating, in accordance with information of the position detected by the detector, display information used for processing for generating the composite image.

In order to solve the aforementioned problems, the present invention provides a non-transitory computer-readable storage medium storing a program for causing a computer to execute a method for controlling an image capture apparatus having a detector, a processor, a display and a controller, the method comprising: detecting a focus adjustment position in an image; generating a composite image in which a guide indicating the detected position is superimposed on the image; displaying the composite image generated by the processor; and updating, in accordance with information of the position detected by the detector, display information used for processing for generating the composite image.

According to the present invention, processing for displaying a guide for confirming a focus position in an image is accelerated, and display that follows object movement and focus detection is enabled.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

In the first embodiment, description is given of AF frame display processing in which only AF frames corresponding to an in-focus position of an object in all AF frames arranged two-dimensionally in an imaging screen are displayed to be superimposed on a live view image, and the other AF frames are not displayed.

Figure 1A:
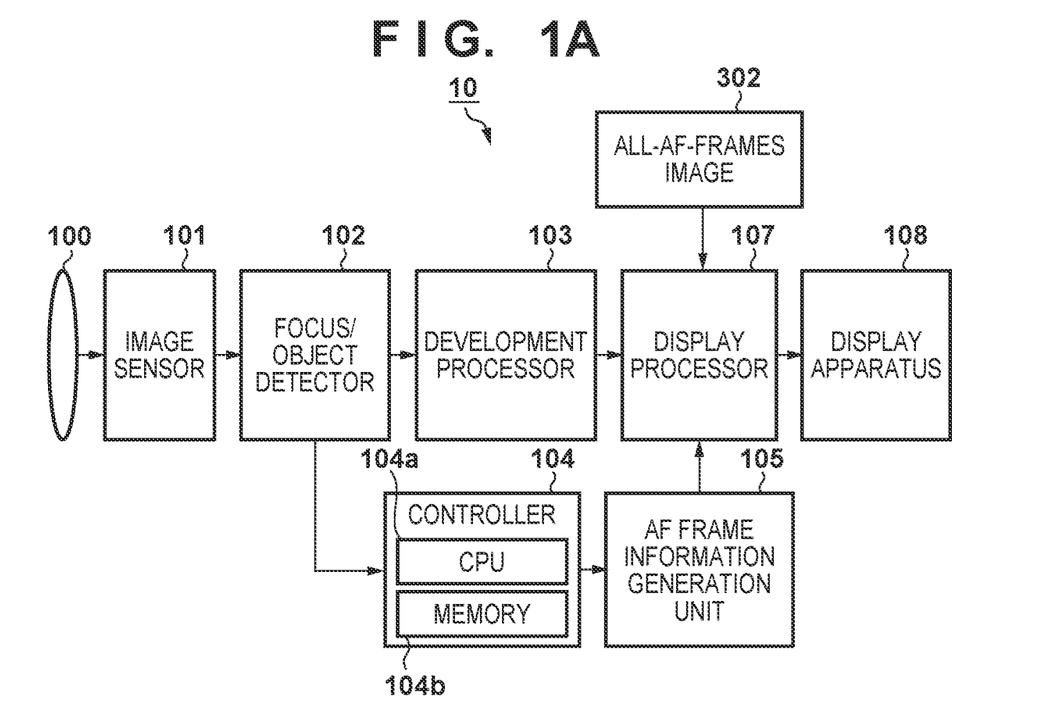
FIG. 1A is a block diagram for illustrating an apparatus configuration of a first embodiment.

First, using FIG. 1A, a configuration of an image capture apparatus of the first embodiment will be described.

The digital camera 10 of the present embodiment is not limited to a digital camera or a digital video camera having an autofocus function, and application to an information processing apparatus such as a mobile phone, to a smart device which is a type thereof, or to a tablet terminal that have a camera function is also possible.

Figure 8A:
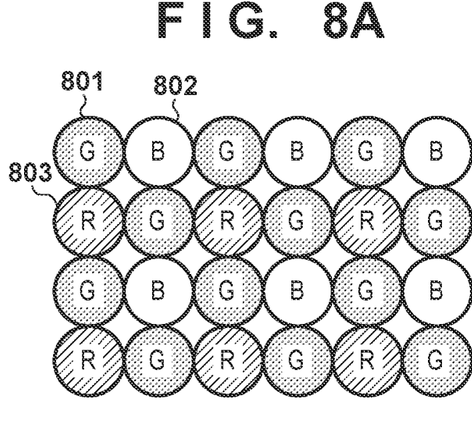
FIGS. 8A to 8C are views for exemplifying pixel arrays of imaging elements.
Figure 8B:
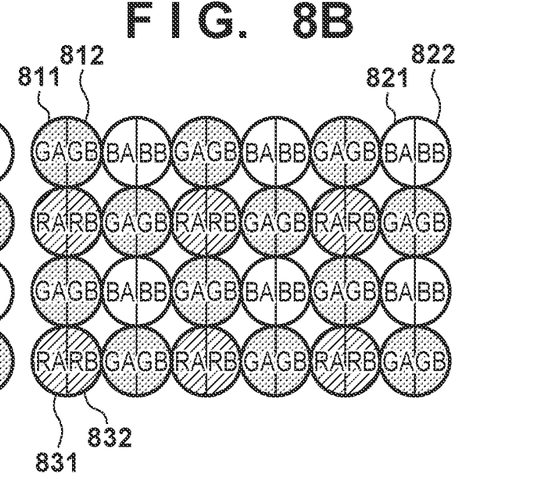

An optical system 100 comprises an imaging lens, a shutter, an aperture, or the like. An image sensor 101 comprises an imaging element such as a CCD, a CMOS, or the like. The image sensor 101 photoelectrically converts the quantity of the light incident through the optical system 100 and a subject image that was formed by focus adjustment, and thereby generates an analog image signal. Also, the image sensor 101 has an AD conversion unit for converting an analog signal into a digital signal. In each pixel of an imaging element of the image sensor 101, a color filter of either R (red), G (green), or B (blue) is arranged regularly in a mosaic, wherein, for example, there is a set of one red pixel, one blue pixel, and two green pixels for every four pixels. Such a pixel arranged is referred to as a Bayer array. FIG. 8A exemplifies a case in which, for each RGB pixel 801, 802, and 803, one pixel is configured by a single region. FIG. 8B exemplifies a case in which, for each RGB pixel 811, 812, 821, 822, 831, and 832, one pixel is configured by two regions (an A image region and a B image region). In the present embodiment, an example in which an image sensor (divided pixel sensor) of the structure of FIG. 8B is employed will be described.

Figure 8C:
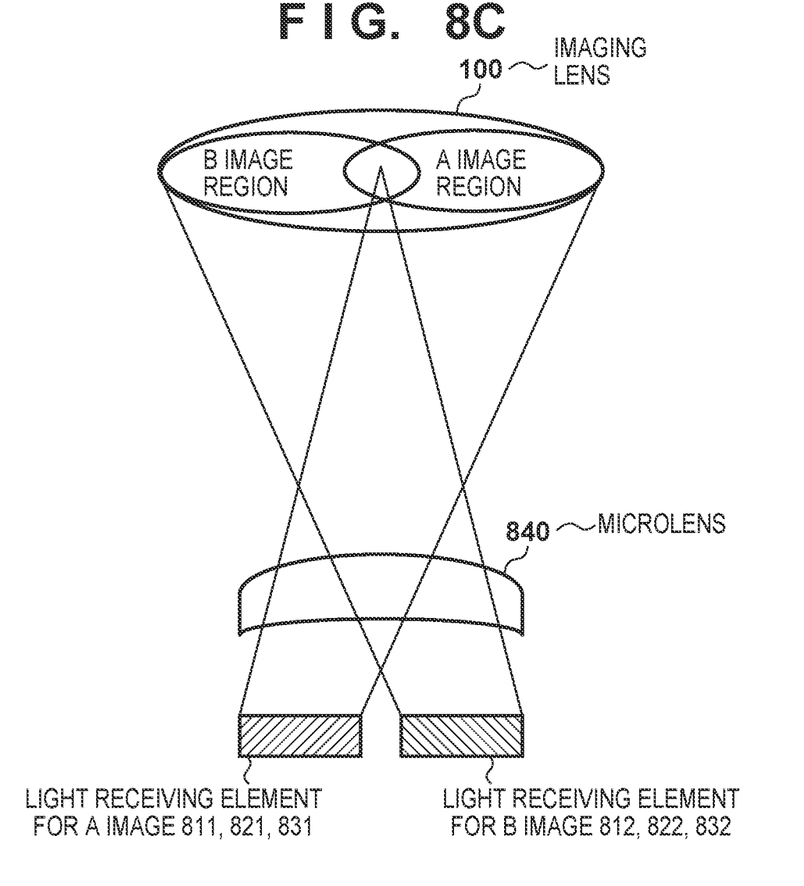

FIG. 8C exemplifies the structure of the image sensor 101 of FIG. 8B. In FIG. 8C, light receiving elements for the A image 811, 821, and 831 receive light that has passed through an A image region of an imaging lens 100, and light receiving elements for the B image 812, 822, and 832 receive light that has passed through a B image region of the imaging lens 100. By receiving the A image and the B image of the same imaging lens in the divided region of each pixel through a single microlens 840, it is possible to obtain two image signals for which there is parallax.

The image signal generated by the image sensor 101 is outputted to a focus/object detector 102 as Bayer image information.

A focus/object detector 102 outputs, to a development processor 103, Bayer image information resulting from adding image information obtained from each of the A image region and the B image region illustrated in FIG. 8C. Also, the focus/object detector 102 has a function for detecting an object in a live view image, a function for detecting a distance of an object, and a function for detecting a degree of focus (degree of out-of-focus) of an object. High-frequency components (edge information of an object) are extracted from the image information and an object is detected based on the size of the extracted components. A FIR (Finite Impulse Response) type bandpass filter, for example, is used as the method of extracting the edge information. Also, the locations at which edge information is extracted may be all locations of the image information, and it is possible to designate a location at which to extract the edge information of a portion in the image information according to object distance information. The object distance and degree of focus are calculated from the parallax information obtained by a correlation calculation for the respective image information of the A image region and the B image region. The focus/object detector 102 detects a plurality of faces in the image information, for example, and calculates distance information and a degree of focus of each detected face, and outputs these to a controller 104.

A development processor 103 obtains Bayer image information from the focus/object detector 102, and performs offset adjustment, gain adjustment, and gamma correction processing on the RGB image signal. Gamma correction is processing for generating, based on characteristics of a lens of the optical system 100, characteristics of the image sensor 101, or the like, image data of tone characteristics that the user desires. The user can change gamma correction values to generate image data for display on a display or to generate image data in which a feeling or tone of a movie film is reproduced. Also, the development processor 103 converts the RGB image signal into a luminance signal (Y) and color difference signals (Cb and Cr), and outputs the result to a display processor 107. Also, the development processor 103 performs lens distortion aberration correction processing, camera vibration damping processing, noise reduction processing, and the like.

The controller 104 includes a CPU 104a which is an arithmetic processing unit and a memory 104b which stores a program that the CPU 104a executes, and controls operation of the entire digital camera 10. In the memory 104b, a later-described AF frame setting table is stored, and the content of the table can be updated by the CPU 104a.

Figure 3A:
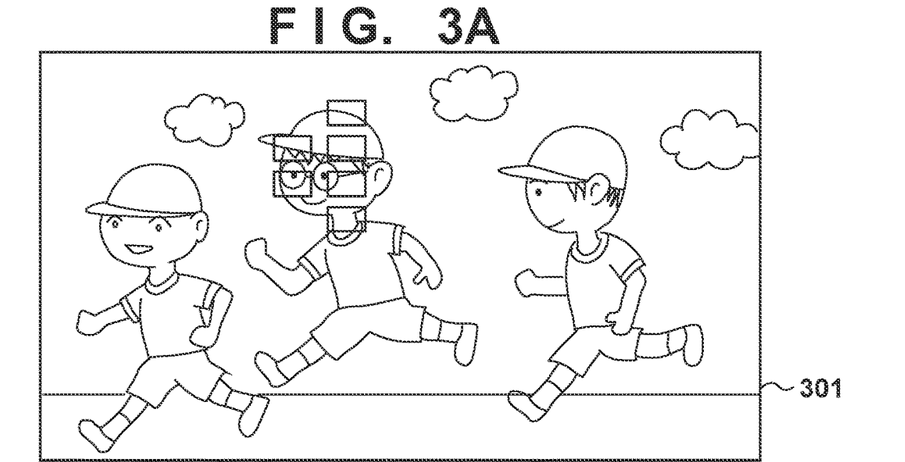
FIGS. 3A to 3E are views for describing AF frame generation processing of the first embodiment.
Figure 3B:
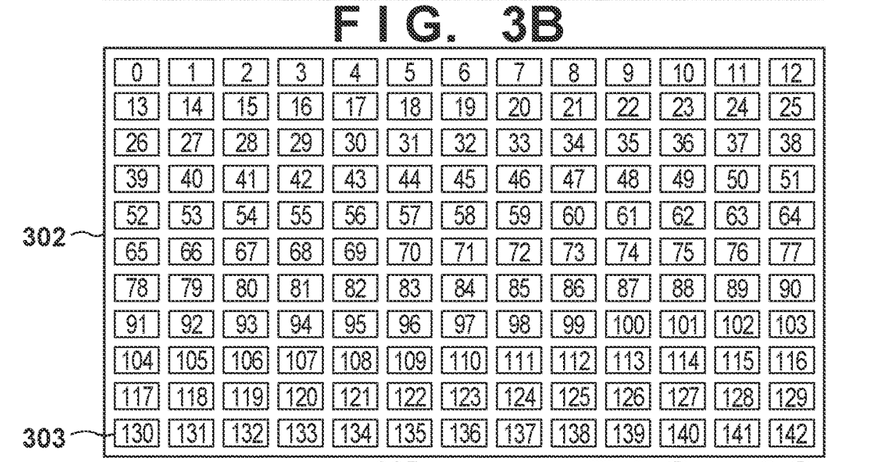

As illustrated in FIG. 3B, an all-AF-frames image 302 is image information in which guides (AF frames) 303 of a quantity equal to the number of positions (distance measurement points) at which detection is possible in the entire imaging screen (the entire imaged image) of the image sensor 101 are rendered. An AF frame 303 is a graphic image of a frame that displays a focus adjustment position (in-focus position) in an image. The all-AF-frames image 302 may be stored in advance in an image memory such as a DRAM (not shown graphically) or the like, and configuration may be taken so as generate the all-AF-frames image 302 by the controller 104 or a rendering processor such as a GPU (Graphics Processing Unit) (not shown graphically). FIG. 3E illustrates an enlargement of three AF frames 303a, 303b, and 303c of the top-left end of the all-AF-frames image 302 of FIG. 3B. For the pixels indicated by the frame 0, the pixel value [0] is held, for the pixels indicated by the frame 1, the pixel value [1] is held, and for a region 303d indicated by hatching other than the frames, information such as the pixel value [1023], for example, is held.

Figure 3C:
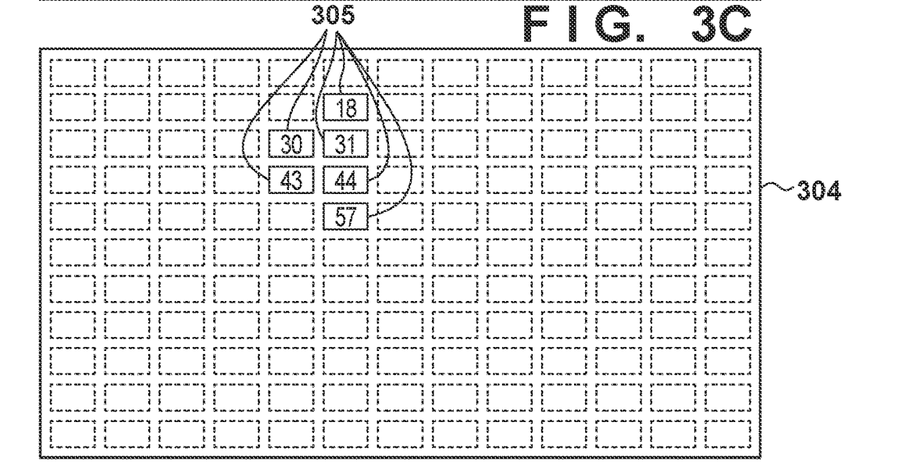
Figure 3D:
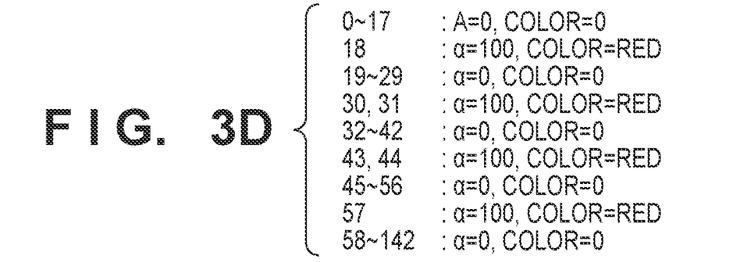
Figure 3E:
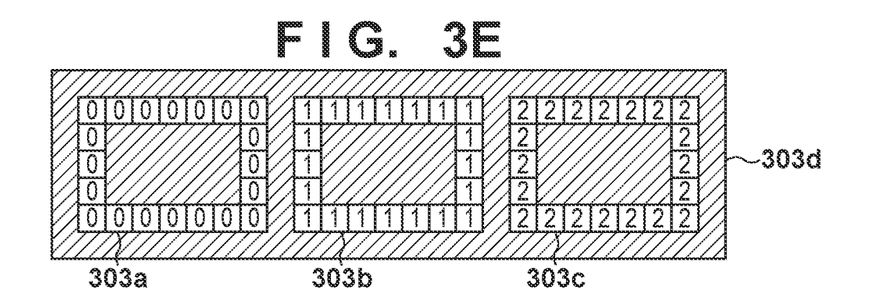

An AF frame information generation unit 105, based on object distance information and degree-of-focus information obtained from the controller 104, generates display information for generating an AF frame image 304 of FIG. 3C. In the AF frame image 304 of FIG. 3C, it is possible to display, out of the all-AF-frames image 302 of FIG. 3B, only the AF frames 305 corresponding to the in-focus position when superimposing onto the live view image. The display information is stored in a lookup table (LUT) for AF frame settings as illustrated in FIG. 3D, and the CPU 104a of the controller 104 updates the content of the LUT in accordance with the successively detected in-focus positions. The LUT includes frame numbers of the AF frames 303, color information for each frame number, and transparency information (an α value in alpha blending), for example. The color information includes a luminance value and color difference values and/or R (red), G (green), and B (blue) values.

A display processor 107 obtains the all-AF-frames image 302 of FIG. 3B. Also, the display processor 107, based on the display information (LUT) generated by the AF frame information generation unit 105, generates the AF frame image 304 where only the AF frames 305 of FIG. 3C which correspond to in-focus positions are displayable (α=100%) out of the all-AF-frames image 302 of FIG. 3B. Regarding the AF frames in the all-AF-frames image 302 of FIG. 3B other than the AF frames 305 of FIG. 3C corresponding to the in-focus position, the compositing ratio α=0% is set. AF frames whose a value (compositing ratio) is 100% are displays as opaque with a transparency of 0%, and the AF frames whose a value (compositing ratio) is 0% are displayed as transparent with a transparency of 100%. Also, the display processor 107 performs alpha blending in which the generated AF frame image 304 is superimposed on the live view image outputted from the development processor 103 in accordance with the α values (compositing ratios), and outputs composite image information 301 illustrated in FIG. 3A to a display apparatus 108 together with a synchronization signal for display. The synchronization signal for display is a horizontal direction synchronization signal for the image, a vertical direction synchronization signal for the image, an effective image position synchronization signal, or the like.

<AF Frame Display Processing During Shooting>

Next, with reference to FIG. 2A, AF frame display processing by the digital camera of the present embodiment will be described.

Figure 2A:
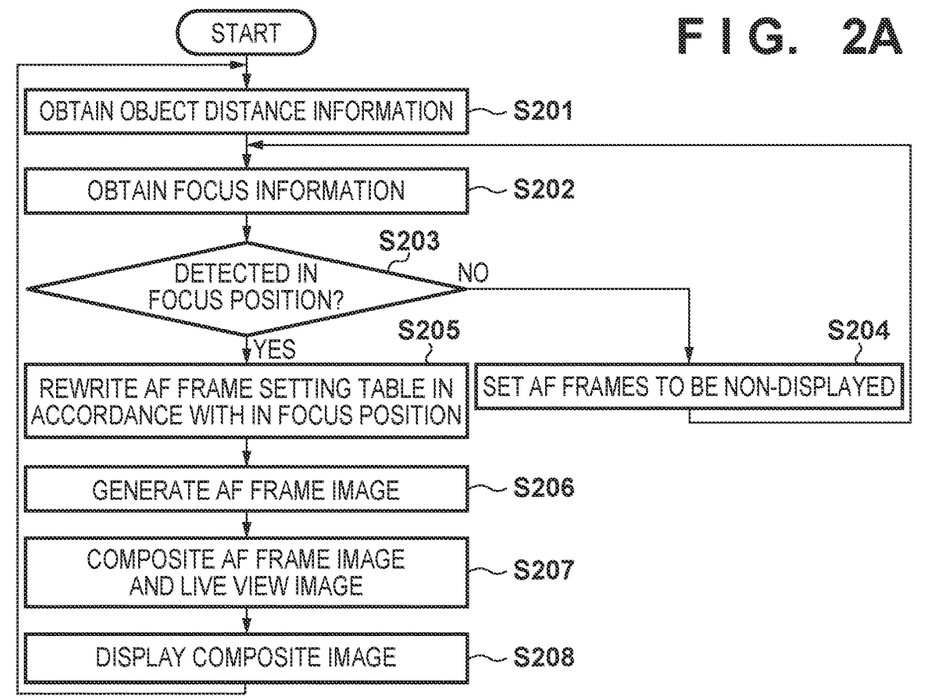
FIG. 2A is a flowchart for illustrating AF frame display processing of the first embodiment.

FIG. 2A is a flowchart for illustrating AF frame display processing at the time of shooting performed by the digital camera of the present embodiment. Note that the processing of FIG. 2A is implemented by the CPU 104a of the controller 104 executing a program stored in the memory 104b, and thereby controlling each part of the camera. Note that the processing of FIG. 2A is started when the digital camera 10 is activated and an AF mode is set.

In step S201, the CPU 104a obtains object distance information calculated by the focus/object detector 102. The focus/object detector 102 calculates object distance information from parallax information obtained from the A image region and the B image region of the imaging lens 100 illustrated in FIG. 8C, and outputs it to the controller 104.

In step S202, the CPU 104a obtains focus information indicating a degree of focus of the object calculated by the focus/object detector 102.

In step S203, the CPU 104a, based on the object distance obtained in step S201 and the focus information obtained in step S202, determines whether it is possible to detect a in-focus position in the live view image.

In a case where a in-focus position cannot be detected in step S203, the CPU 104a, after making the AF frames non-displayed in step S204, returns to step S202 and obtains focus information once again. Meanwhile, in a case where it is possible to detect a in-focus position in step S203, the CPU 104a, in step S205, rewrites the LUT (hereinafter, the AF frame setting table) for AF frame settings of FIG. 3D in accordance with the in-focus position. For example, in a case where in-focus positions are the six regions of the frame numbers 18, 30, 31, 43, 44, and 57 in the all-AF-frames image 302 of FIG. 3B, rewriting of transparency information (α) to 100% and the color information to red is performed only for the numbers corresponding to the AF frame setting table indicated in FIG. 3D generated by the AF frame information generation unit 105. The color information includes a luminance value and color difference values and/or R (red), G (green), and B (blue) values. In the present embodiment, processing for updating the AF frame setting table is executed by the CPU 104a of the controller 104 without accessing the image memory (the VRAM) in which the AF frame image is rendered, and so a high-speed rewrite is possible. Accordingly, AF frame display processing is accelerated, and it becomes possible to display AF frames that follow the movement of the object and focus detection.

Figure 7:
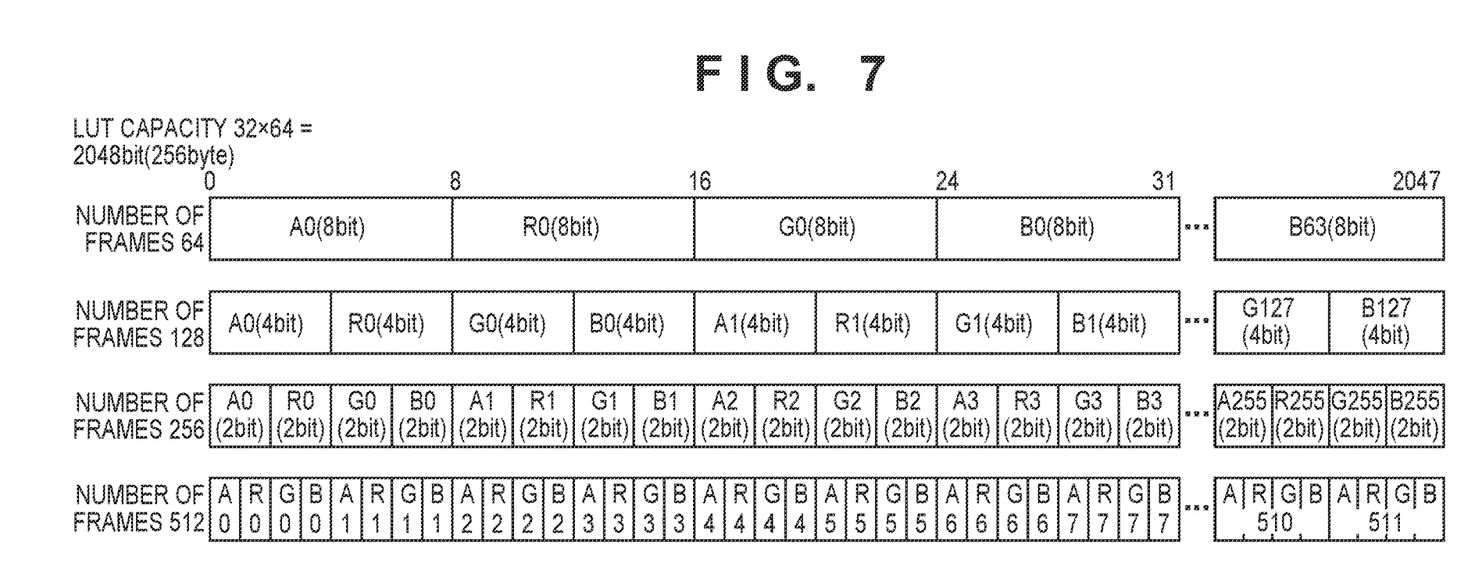
FIG. 7 is a view exemplifying an LUT used to generate an AF frame.

Also, in a case where the data capacity of the AF frame setting table is fixed, it is possible to change the color information and transparency information resolution in accordance with the number of AF frames within the data capacity. For example, as illustrated in FIG. 7, in a case where the AF frame setting table is of a 256-byte capacity, it is possible to store the data of the color information and transparency information each in 8 bits when the number of frames is 64. Similarly, it is possible to store data for each of the color information and transparency information in 4 bits when the number of frames is 128, 2 bits when the number of frames is 256, and 1 bit when the number of frames is 512.

In step S206, the CPU 104a reads the all-AF-frames image 302 of FIG. 3B from the image memory (VRAM) (not shown graphically) or the like by the display processor 107. Also, the CPU 104a, based on the AF frame setting table rewritten in step S205, generates the AF frame image 304 in which only the AF frames 305 of the in-focus position as illustrated in FIG. 3C are displayable from the all-AF-frames image 302 of FIG. 3B. Regarding the all-AF-frames image 302, the size of one frame and the number of frames can change depending on the characteristics of the image sensor 101 or the like. The all-AF-frames image 302 may be stored in the memory 104b of the controller 104 in advance, and may be generated by the CPU 104a or a rendering processor such as in a GPU (not shown graphically).

In step S207, the CPU 104a composites, by the display processor 107, the live view image outputted from the development processor 103 and the AF frame image 304 generated in step S206, and thereby generates the composite image 301 illustrated in FIG. 3A.

In step S208, the CPU 104a displays the composite image 301 generated in step S207 on the display apparatus 108 and then repeats the processing from step S201.

Figure 5A:
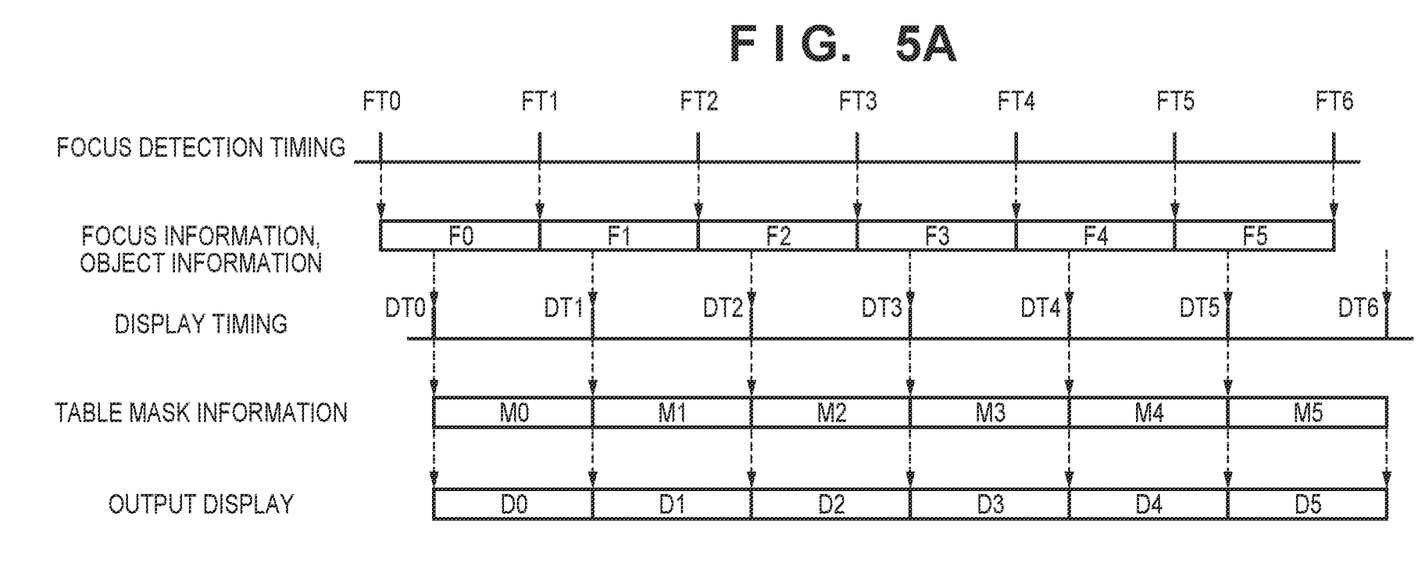
FIGS. 5A and 5B are timing charts for illustrating AF frame display processing of the first and second embodiments.
Figure 5B:
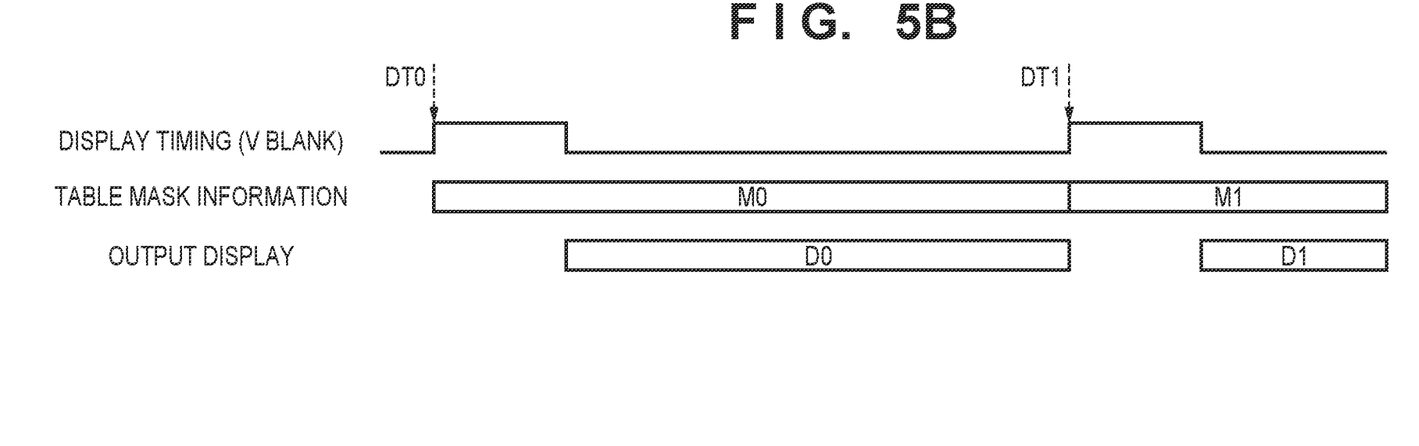

Next, the processing from step S202 to step S208 of FIG. 2A will be described using the timing charts illustrated in FIGS. 5A and 5B.

The focus detection timings are indicated by FT (Focus Timing), and for example, focus detection is performed at a frequency of 120 Hz or 60 Hz, and the focus information is updated at each FT.

Display timings are indicated by DT (Display Timing), and there are cases where their period is different to that of the FTs, and there are cases where their period is the same as that of the FTs but the phase is different. The focus information F1 updated at FT1 is obtained at DT1, and used as table mask information M1 for the AF frame setting table, to output a display of image information D1. By updating the AF frame setting table at the closest DT from the FT change point, it is possible to display AF frames that follow the focus detection. The table mask information M is updated at a rising change point of a DT wave, and the period of time from the fall to the rise of the DT wave is an active display period, and display of the image D is outputted.

By the above-described processing, AF frame display processing is accelerated, and it becomes possible to display AF frames that follow the movement of the object and focus detection.

Figure 6A:
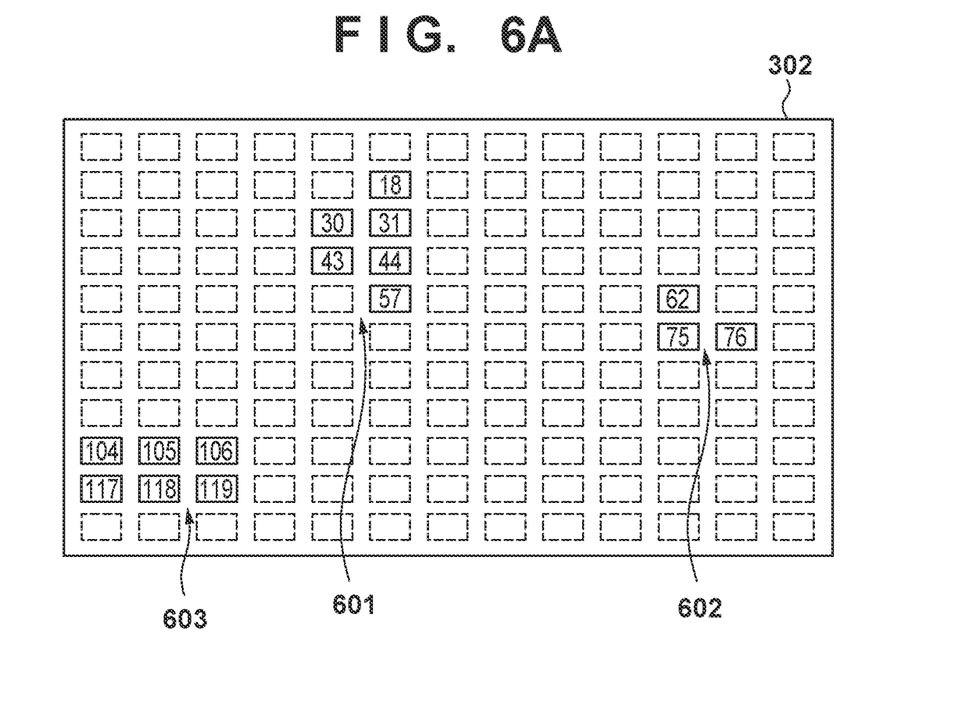
FIGS. 6A and 6B are views for exemplifying an AF frame and display information for the AF frame.
Figure 6B:
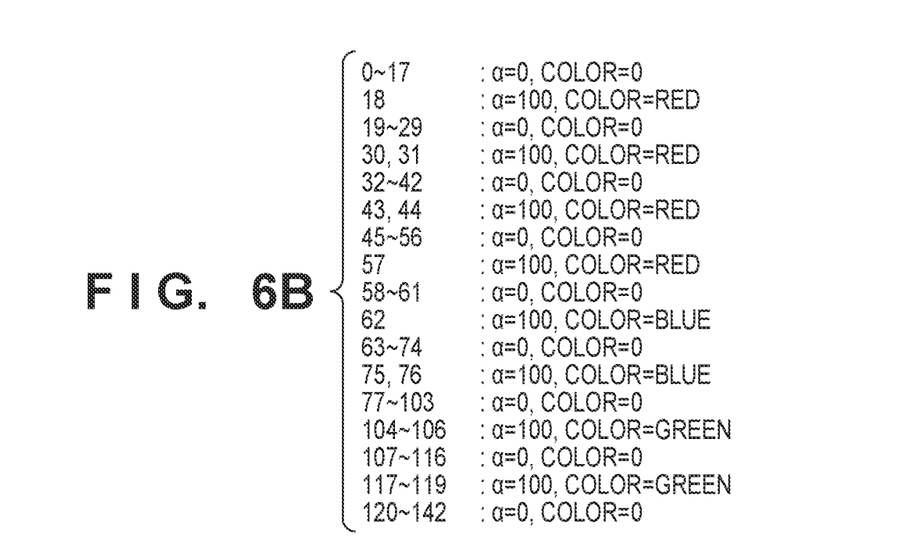

Note that in the first embodiment, an example of displaying six adjacent AF frames 305 in the all-AF-frames image 302 was given, but it is possible to simultaneously display AF frames on a plurality of separated regions (three locations) 601, 602, and 603 in the imaging screen as illustrated in FIG. 6A. Furthermore, it is possible to set the colors of the AF frames of the three locations 601, 602, and 603 illustrated in FIG. 6A to be different colors such as red, blue, and green in the AF frame setting table as illustrated in FIG. 6B.

Second Embodiment

In the second embodiment, AF frame display processing in which, from the all-AF-frames image arranged two-dimensionally in the imaging screen, only AF frames corresponding to an in-focus object position are cut out (extracted), and displayed to be superimposed on the live view image will be described.

Figure 1B:
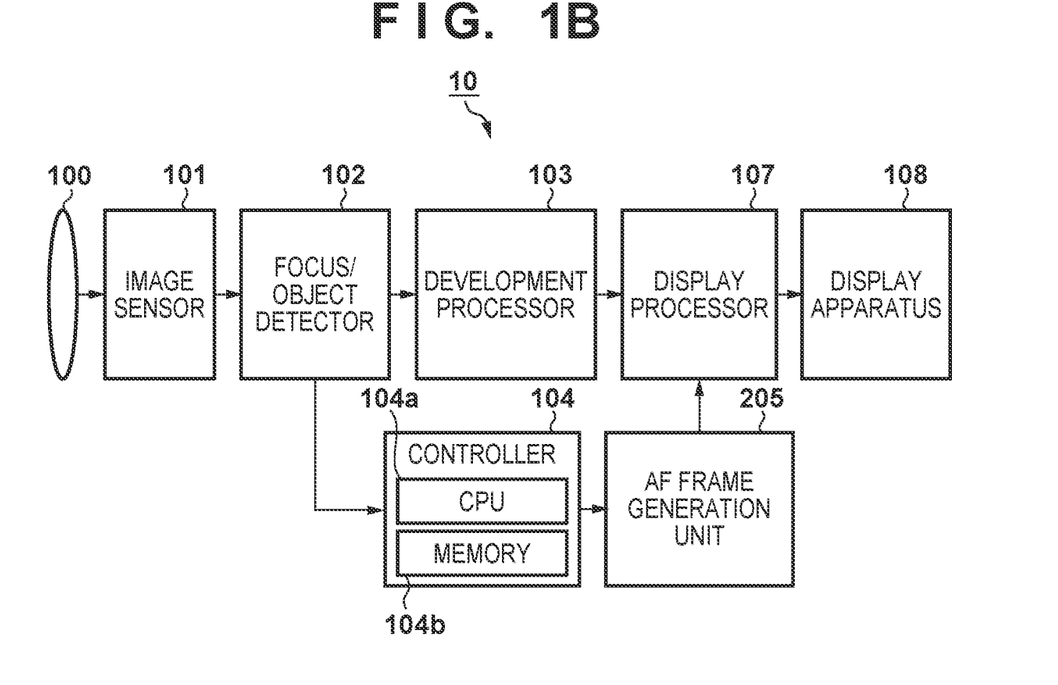
FIG. 1B is a block diagram for illustrating an apparatus configuration of a second embodiment.

FIG. 1B exemplifies an apparatus configuration of a digital camera of the second embodiment. In the digital camera 10 of the present embodiment, an AF frame generation unit 205 is provided in place of the AF frame information generation unit 105 illustrated in FIG. 1A of the first embodiment. Other configurations are similar to FIG. 1A and so description thereof is omitted.

Figure 4A:
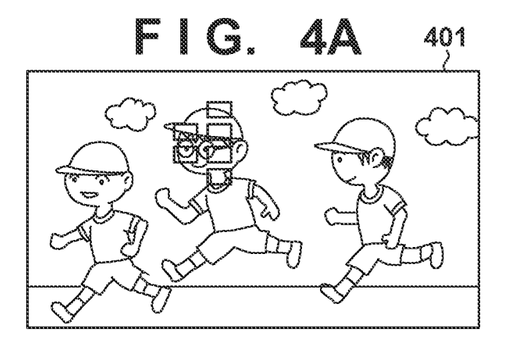
FIGS. 4A to 4G are views for describing AF frame generation processing of the second embodiment.

The AF frame generation unit 205 generates an AF frame image in accordance with the position and shape of an in-focus object detected by the focus/object detector 102. The AF frame generation unit 205 cuts out, from the all-AF-frames image 402 illustrated in FIG. 4B, an AF frame 403 indicated in FIG. 4C in accordance with the coordinates (x, y) of the position of the in-focus object illustrated in FIG. 4E, for example, and further generates the AF frame image 404 of only frames that accord to the shape of the object as illustrated in FIG. 4D. The AF frame image 404 of FIG. 4D, similarly to the first embodiment is generated using the AF frame setting table illustrated in FIG. 4F. FIG. 4G illustrates an enlargement of the AF frame 403 of FIG. 4C. For each pixel indicated by the frames 0 to 7 and the region illustrated in hatching other than the frames, information of each pixel value is held.

Next, with reference to FIG. 2B, AF frame display processing by the digital camera of the second embodiment will be described.

Figure 2B:
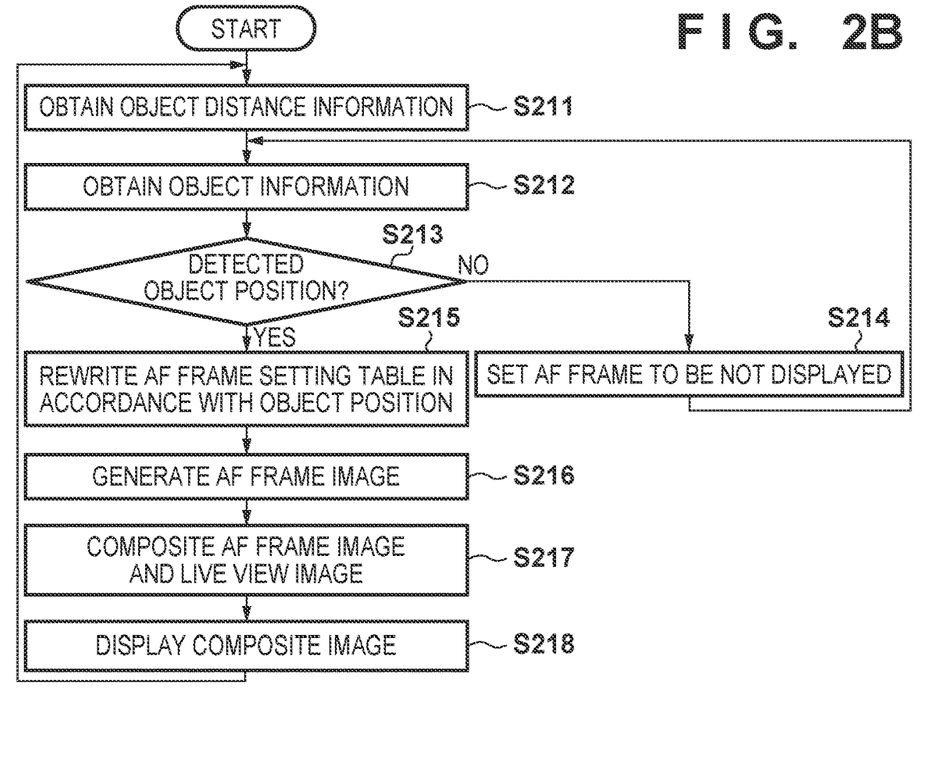
FIG. 2B is a flowchart for illustrating AF frame display processing of the second embodiment.

FIG. 2B is a flowchart for illustrating AF frame display processing at the time of shooting performed by the digital camera of the present embodiment. Note that the processing of FIG. 2B is implemented by the CPU 104a of the controller 104 executing a program stored in the memory 104b, and thereby controlling each part of the camera. Note that the processing of FIG. 2B is started when the digital camera 10 is activated and an AF mode is set.

In step S211, the CPU 104a obtains object distance information calculated by the focus/object detector 102. The focus/object detector 102 calculates object distance information from parallax information obtained from the A image region and the B image region illustrated in FIG. 8C, and outputs it to the controller 104.

In step S212, the CPU 104a obtains object information indicating a position, shape, and a degree of focus of the object calculated by the focus/object detector 102.

In step S213, the CPU 104a, based on the object distance obtained in step S211 and the object information obtained in step S212, determines whether it is possible to detect the position of an in-focus object.

In a case where an in-focus object cannot be detected in step S213, the CPU 104a, after making the AF frame not displayed in step S214, returns to step S212 and obtains the object information once again. In step S212, object position detection is performed. Meanwhile, in a case where it is not possible to detect the position of an in-focus object in step S213, the CPU 104a rewrites the AF frame setting table illustrated in FIG. 4F in accordance with the position of the in-focus object in step S215. For example, in a case where the positions of the in-focus object are the six regions whose frame numbers are 1, 2, 3, 4, 5, and 7 illustrated in FIG. 4D, transparency information ($\alpha$) is rewritten to 100% and the color information to red only for the numbers corresponding to the AF frame setting table illustrated in FIG. 4F out of the AF frame 403 illustrated in FIG. 4C generated by the AF frame generation unit 205. The color information may be set by a luminance value and color difference values or R (red), G (green), and B (blue) values, or the like. In the present embodiment, processing for updating the AF frame setting table is executed by the CPU 104a of the controller 104 without accessing the image memory (the VRAM) in which the AF frame image is rendered, and so a high-speed rewrite is possible. Accordingly, AF frame display processing is accelerated, and it becomes possible to display AF frames that follow the movement of the object in the live view image and focus detection. Also, in a case where the data capacity of the AF frame setting table is fixed, it is possible to change the color information and transparency information resolution in accordance with the number of AF frames within the data capacity. For example, as illustrated in FIG. 7, in a case where the AF frame setting table is fixed at a 256-byte capacity, it is possible to store the data of the color information and transparency information each in 8 bits when the number of frames is 64. Similarly, it is possible to store data for each of the color information and transparency information in 4 bits when the number of frames is 128, 2 bits when the number of frames is 256, and 1 bit when the number of frames is 512.

Figure 4B:
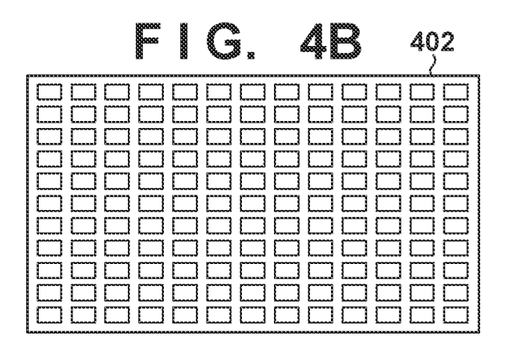
Figure 4C:
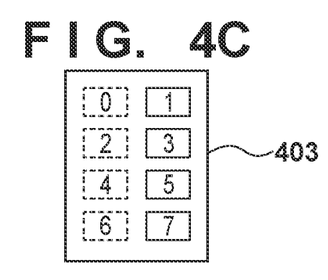
Figure 4D:
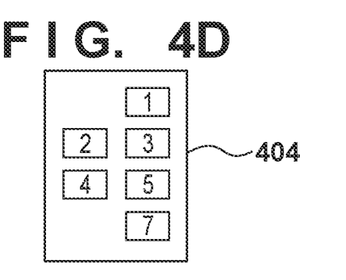

In step S216, the CPU 104a reads the all-AF-frames image 402 illustrated in FIG. 4B from the image memory (VRAM) (not shown graphically) or the like by the display processor 107, cuts out the AF frame 403 illustrated in FIG. 4C in accordance with the in-focus object position from the all-AF-frames image 402, and further generates the AF frame image 404 of only frames that accord to the object shape as illustrated in FIG. 4D. Regarding the all-AF-frames image 402, the size of one frame and the number of frames can change depending on the characteristics of the image sensor 101 or the like. The all-AF-frames image 402 may be stored in the memory 104b of the controller 104 in advance, and may be generated by the CPU 104a or a rendering processor such as in a GPU (not shown graphically).

Figure 4E:
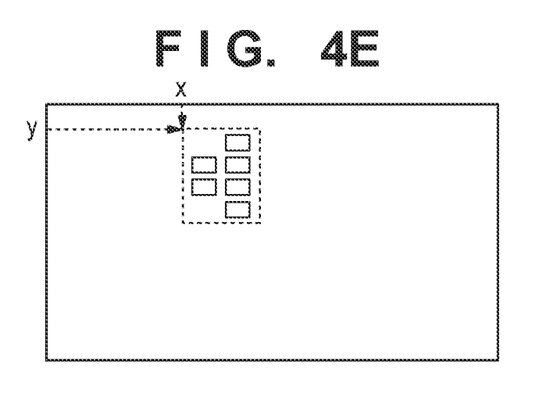
Figure 4F:
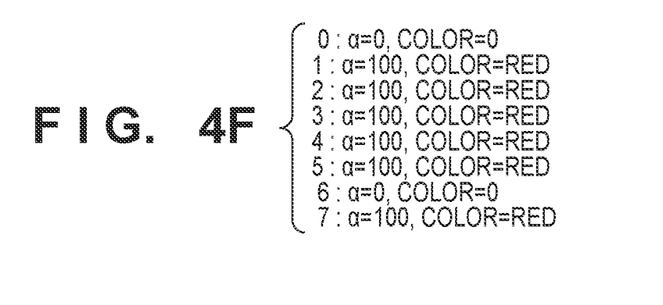
Figure 4G:
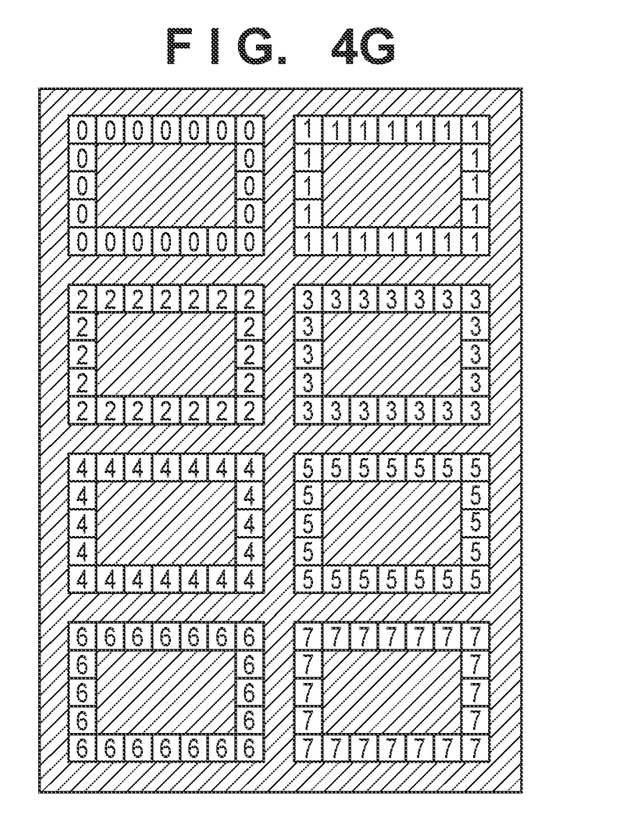

In step S217, the CPU 104a, by the display processor 107, composites, in accordance with the coordinates (x, y) of the position of the object illustrated in FIG. 4E, the live view image outputted from the development processor 103 and the AF frame image 404 generated in step S216, and thereby generates the composite image 401 illustrated in FIG. 4A. Regarding the position of the object illustrated in FIG. 4E, it is possible to composite by designating positions in the horizontal direction x and the vertical direction y with the top-left of the live view image as the origin, for example.

In step S218, the CPU 104a displays the composite image 401 generated in step S217 on the display apparatus 108, and repeats the processing from step S211.

Next, the processing from step S212 to step S218 of FIG. 2B will be described using the timing charts illustrated in FIGS. 5A and 5B.

For example, focus detection is performed at a frequency of 120 Hz or 60 Hz, and object information is updated at each focus detection timing FT. For the display timing DT, the object information F1 updated at FT1 is obtained at DT1, and used as table mask information M1 for the AF frame setting table, to output a display of image information D1. By updating the AF frame setting table at the closest DT from the FT change point, it is possible to display AF frames that follow the focus detection. The table mask information M is updated at a rising change point of the DT wave, and the period of time from the fall to the rise of the DT wave is an active display period, and display of the image D is outputted.

By the above-described processing, AF frame display processing is accelerated, and it becomes possible to display AF frames that follow the movement and position of the object.

Note that in the second embodiment, an example of displaying six adjacent AF frames (AF frame image 404) in the all-AF-frames image 402 was given, but it is possible to simultaneously display AF frames on a plurality of separated regions (three locations) 601, 602, and 603 in the imaging screen as illustrated in FIG. 6A. Furthermore, it is possible to set the colors of the AF frames of the three locations 601, 602, and 603 illustrated in FIG. 6A to be different colors such as red, blue, and green in the AF frame setting table as illustrated in FIG. 6B.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-091406, filed May 10, 2018 which is hereby incorporated by reference herein in its entirety.

What is claimed is:

1. An image capturing apparatus, comprising:
a detector configured to detect a focus adjustment position in an image;
a processor configured to generate a composite image in which a guide indicating the detected position is superimposed on the image;
a display configured to display the composite image generated by the processor;
a controller configured to update, in accordance with information of the position detected by the detector, display information used for processing for generating the composite image; and
a memory configured to store guide images including a plurality of guides of a quantity equal to a number of positions that the detector can detect in a whole image,
wherein the display information includes information indicating a ratio of compositing the image with respective guides, and
the controller updates the information indicating the ratio such that among the plurality of guides a transparency of the guide corresponding to the detected position is lower than a transparency of the guide not corresponding to the detected position,
wherein the display information is stored as a lookup table that the controller updates, and
within a data capacity of the lookup table, a resolution of information indicating the ratio for compositing can be changed in accordance with the quantity of the plurality of guides.

2. The apparatus according to claim 1, wherein the guide is a frame that indicates the detected position.

3. The apparatus according to claim 1, wherein the display information includes respective color information of the plurality of guides.

4. The apparatus according to claim 3, wherein within a data capacity of the lookup table, a resolution of the color information and the information indicating the ratio for compositing can be changed in accordance with the quantity of the plurality of guides.

5. The apparatus according to claim 1, wherein the controller updates the display information at a display timing closest to a detection timing of the detector.

6. The apparatus according to claim 1, wherein the focus adjustment position is an in-focus position according to an autofocus function or a position of an in-focus object.

7. The apparatus according to claim 1, further comprising an image sensor configured to image an image,
wherein the plurality of guides are superimposed on a focus adjustment position in an imaged live view image.

8. A method for controlling an image capture apparatus having a detector, a processor, a display and a controller, the method comprising:
detecting a focus adjustment position in an image;
generating a composite image in which a guide indicating the detected position is superimposed on the image;
displaying the composite image generated by the processor;
updating, in accordance with information of the position detected by the detector, display information used for processing for generating the composite image; and
storing guide images including a plurality of guides of a quantity equal to the number of positions that the detector can detect in a whole image,
wherein the display information includes information indicating a ratio of compositing the image with respective guides, and the information is updated to indicate the ratio such that among the plurality of guides a transparency of the guide corresponding to the detected position is lower than a transparency of the guide not corresponding to the detected position, wherein the display information is stored as a lookup table that the controller updates, and within a data capacity of the lookup table, a resolution of information indicating the ratio for compositing can be changed in accordance with the quantity of the plurality of guides.

9. The method according to claim 8, wherein the guide is a frame that indicates the detected position.

10. The method according to claim 8, wherein the display information includes respective color information of the plurality of guides.

11. The method according to claim 10, wherein within a data capacity of the lookup table, a resolution of the color information and the information indicating the ratio for compositing can be changed in accordance with the quantity of the plurality of guides.

12. The method according to claim 8, wherein the controller updates the display information at a display timing closest to the detection timing of the detector.

13. The method according to claim 8, wherein the focus adjustment position is an in-focus position according to an autofocus function or a position of an in-focus object.

14. The method according to claim 8, wherein the plurality of guides are superimposed at a focus adjustment position in a live view image imaged by an image sensor.

15. A non-transitory computer-readable storage medium storing a program for causing a computer to execute a method for controlling an image capture apparatus having a detector, a processor, a display and a controller, the method comprising:

detecting a focus adjustment position in an image;

generating a composite image in which a guide indicating the detected position is superimposed on the image;

displaying the composite image generated by the processor;

updating, in accordance with information of the position detected by the detector, display information used for processing for generating the composite image; and storing guide images including a plurality of guides of a quantity equal to the number of positions that the detector can detect in a whole image, wherein the display information includes information indicating a ratio of compositing the image with respective guides, and the information is updated to indicate the ratio such that among the plurality of guides a transparency of the guide corresponding to the detected position is lower than a transparency of the guide not corresponding to the detected position, wherein the display information is stored as a lookup table that the controller updates, and within a data capacity of the lookup table, a resolution of information indicating the ratio for compositing can be changed in accordance with the quantity of the plurality of guides.

* * * * *